United States Patent
Kim et al.

(10) Patent No.: US 12,538,345 B2
(45) Date of Patent: Jan. 27, 2026

(54) GATEWAY FOR ALLOCATING UPLINK FREQUENCY BANDS AND BACKSCATTERING IoT DEVICE AND METHOD

(71) Applicant: RESEARCH & BUSINESS FOUNDATION SUNGKYUNKWAN UNIVERSITY, Suwon-si (KR)

(72) Inventors: Dong In Kim, Seongnam-si (KR); Hyun Suk Choi, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 938 days.

(21) Appl. No.: 17/529,784

(22) Filed: Nov. 18, 2021

(65) Prior Publication Data
US 2022/0159671 A1    May 19, 2022

(30) Foreign Application Priority Data
Nov. 18, 2020  (KR) .......................... 10-2020-0154996

(51) Int. Cl.
*H04W 72/542* (2023.01)
*G16Y 20/30* (2020.01)
*H04L 47/629* (2022.01)

(52) U.S. Cl.
CPC ........... *H04W 72/542* (2023.01); *G16Y 20/30* (2020.01); *H04L 47/629* (2013.01)

(58) Field of Classification Search
CPC . H04W 72/542; H04W 72/0453; H04W 4/70; H04W 72/0473; H04W 72/53; H04W 88/16; G16Y 20/30; H04L 47/629; Y02D 30/70; H02J 50/001; H02J 50/20; H04B 7/22

See application file for complete search history.

(56) References Cited

U.S. PATENT DOCUMENTS 11,622,355 B2 *  4/2023  Alizadeh ............. H04W 52/283
                                                         455/522
12,107,711 B2 * 10/2024  Haque ..................... H04B 5/70
(Continued)

FOREIGN PATENT DOCUMENTS

KR         102240566 B1 * 10/2020   ......... H04B 7/04013

OTHER PUBLICATIONS

Liu, Chen-Feng, et al. "Simultaneous Wireless Information and Power Transfer Under Different CSI Acquisition Schemes." IEEE Transactions on Wireless Communications 14.4 (2014): 1911-1926.
(Continued)

*Primary Examiner* — Mounir Moutaouakil
(74) *Attorney, Agent, or Firm* — NSIP Law

(57) ABSTRACT

A backscattering method for an Internet-of-things (IoT) device includes a frequency-splitting (FS)-simultaneous wireless information and power transfer (SWIPT) wireless communication system. The backscattering method includes collecting energy by simultaneously receiving power having a first frequency, receiving data having a first frequency band, and decoding the data; determining a second frequency band to uplink; and transmitting tag information in the second frequency band using the power having the first frequency in a backscattering manner.

7 Claims, 12 Drawing Sheets

(56) References Cited

U.S. PATENT DOCUMENTS

2020/0169318 A1* 5/2020 Kim .................. H04B 17/309
2021/0126359 A1* 4/2021 Kim .................... H04B 7/145
2021/0126488 A1* 4/2021 Kim ..................... H02J 50/20

OTHER PUBLICATIONS

Perera, Tharindu D. Ponnimbaduge, et al. "Simultaneous Wireless Information and Power Transfer (SWIPT): Recent Advances and Future Challenges." IEEE Communications Surveys & Tutorials 20.1 (2018): 264-302.
Korean Office Action issued on Oct. 27, 2022, in counterpart Korean Patent Application No. 10-2020-0154996 (5 pages in Korean).

* cited by examiner

GATEWAY FOR ALLOCATING UPLINK FREQUENCY BANDS AND BACKSCATTERING IoT DEVICE AND METHOD

CROSS-REFERENCE TO RELATED APPLICATIONS

This application claims the benefit under 35 USC 119(a) of Korean Patent Application No. 10-2020-0154996 filed on Nov. 18, 2021, in the Korean Intellectual Property Office, the entire disclosure of which is incorporated herein by reference for all purposes.

BACKGROUND

1. Field

The following description relates to a gateway for allocating an uplink frequency band and a backscattering IoT device and method.

2. Description of the Related Art

As the Internet, which connects computer devices around the world to allow information to be exchanged with each other, has developed and is commonly used, Internet-of-things (IoT) technology for exchanging data through the Internet in real time by attaching sensors to things has been proposed.

This IoT technology is referred to as a next-generation revolution following the Internet revolution and an IoT device market has grown rapidly.

In order for IoT sensors to perform communication using low power, a simultaneous wireless information and power transfer (SWIPT) technique of transmitting information and power at the same time has been researched as a downlink transmission technique. SWIPT is a technique of simultaneously transmitting a communication signal for information transmission and a power signal for a power-free operation of a low-power IoT sensor and, representatively, there is a power-splitting (PS) SWIPT technique. A PS-SWIPT signal simultaneously transmits power using a modulated communication signal that transmits information, and thus, the PS-SWIPT signal shares a spectrum. Thus, the low power IoT sensor, receiving the PS-SWIPT signal, separately performs power collecting and information decoding by splitting power of the PS-SWIPT signal. Accordingly, the PS-SWIPT technique uses the modulated communication signal as a power signal, thus generally having a high peak-to-average power ratio according to modulation and resultantly significantly affected by a non-linear distortion that occurs while passing through a high power amplifier of a transmitter and a wireless channel, so that power collecting efficiency, as well as communication performance, is deteriorated. In addition, since receive sensitivity of the power signal is relatively high, if the communication signal is transmitted by increasing power for energy transmission, strong interference may occur to other users or systems that share a frequency to restrict an operation of a communication system, which, thus, needs to be considered.

Meanwhile, backscatter communication is a method of reflecting or absorbing an RF signal incident through impedance mismatching/matching between an antenna and a load impedance in a backscattering tag and transmitting a signal to a receiver by a change in reflected energy. This backscatter communication is a passive communication technique that does not use active elements such as an oscillator, an amplifier, and a mixer, and requires very little power. Backscattering techniques include monostatic and bistatic backscattering techniques using unmodulated carriers. Recently, an ambient backscatter communication technique that performs backscattering using a modulated RF signal such as TV, FM, Wi-Fi, etc., which already exists around, as a carrier, has been studied.

Ambient backscatter communication uses an ambient RF signal source and does not need to generate an unmodulated carrier, unlike bistatic backscatter or monostatic backscatter, and thus, more energy-efficient communication may be performed. However, since backscattering is performed through the modulated RF signal, a signal in which primary information transmitted to a legacy user and information of a tag are mixed is transmitted. In addition, in a receiver, direct link interference (DLI) of an ambient RF signal that does not go through a backscatter tag occurs. Therefore, it may be desired to remove the relatively strong DLI interference to decode the ambient backscatter signal. In order to decode a signal in which main information and tag information are mixed, a complex interference cancellation technique or an averaging mechanism using an envelope detector should be used. However, the former increases complexity of the receiver, and since it is difficult to completely remove interference, decoding performance is also degraded. In the latter case, there is a problem in that it is difficult to support a high transfer rate because a transfer rate of the backscatter tag should be very low compared to an RF signal to remove the RF signal source by envelope detection.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a backscattering method for an Internet-of-things (IoT) device includes a frequency-splitting (FS)-simultaneous wireless information and power transfer (SWIPT) wireless communication system. The backscattering method includes collecting energy by simultaneously receiving power having a first frequency, receiving data having a first frequency band, and decoding the data; determining a second frequency band to uplink; and transmitting tag information in the second frequency band using the power having the first frequency in a backscattering manner.

The second frequency band may be allocated based on any one or any combination of any two or more of amounts of the collected energy, a channel environment, fairness, and traffic.

The fairness may be determined based on a ratio of a current maximum transfer rate to a previous average transfer rate in each time slot.

The traffic may be in proportion to the number of time slots not transmitted to the uplink but accumulated in a queue.

The second frequency band may be closer to the first frequency than the first frequency band.

In another general aspect, a method of allocating an uplink frequency band for an Internet-of-things (IoT) device by a gateway includes a frequency-splitting (FS)-simultaneous wireless information and power transfer (SWIPT)

wireless communication system. The method includes generating a set of IoT devices with collected energy equal to or greater than a preset threshold energy; determining weights of the set of IoT devices based on a channel environment and fairness of each of the IoT devices in the set of IoT devices, and sorting the IoT devices in order of weight; determining a frequency band to be allocated to each of the sorted IoT devices based on traffic to a corresponding IoT device of the sorted IoT devices; and allocating the determined frequency bands to the sorted IoT devices.

The fairness may be determined based on a ratio of a current maximum transfer rate to a previous average transfer rate in each timeslot.

The traffic determined in proportion to the number of time slots not transmitted to uplink but accumulated in a queue may be applied to the Shannon's channel capacity theorem.

In the allocating of the determined frequency band, when the frequency band to be allocated exceeds a predetermined variable frequency band, another weight and another frequency band may be determined for transmission in a next time slot for the corresponding IoT device and an IoT device having a weight lower than that of the corresponding IoT device.

In another general aspect, an Internet-of-things (IoT) device includes a frequency-splitting (FS)-simultaneous wireless information and power transfer (SWIPT) wireless communication system. The IoT device includes a communicator configured to receive power having a first frequency and data having a first frequency band, a charger configured to collect energy from the power having the first frequency, and a controller configured to decode received data, determine a second frequency band used as uplink, and perform control to transmit tag information in the second frequency band using the power having the first frequency in a backscattering manner.

The controller may be further configured to allocate the second frequency band to the IoT device based on any one or any combination of any two or more of amounts of the collected energy, a channel environment, fairness, and traffic.

In another general aspect, a gateway for allocating an uplink frequency band of an IoT device of a frequency-splitting (FS)-simultaneous wireless information and power transfer (SWIPT) wireless communication system. The gateway includes a transceiver configured to simultaneously transmit FS-SWIPT-based power and information; and a controller configured to generate a set of IoT devices with collected energy equal to or greater than a preset threshold energy, determine weights of the set of IoT devices based on a channel environment and fairness of each of the IoT devices in the set of IoT devices, sort the IoT devices in order of weight, determine a frequency band to be allocated to each of the sorted IoT devices based on traffic a corresponding IoT device, and allocate the determined frequency band to the sorted IoT devices.

The controller may be further configured to determine the fairness based on a ratio of a current maximum transfer rate to a previous average transfer rate in each time slot.

The controller may be further configured to apply the traffic determined in proportion to the number of time slots not transmitted to uplink but accumulated in a queue to the Shannon's channel capacity theorem.

When the frequency band to be allocated exceeds a predetermined variable frequency band, the controller may be further configured to determine another weight and another frequency band for transmission in a next time slot for the corresponding IoT device and an IoT device having a weight lower than that of the corresponding IoT device.

The controller may be further configured to allocate a frequency band nearer to the first frequency as the IoT device becomes closer to the gateway.

The controller may be further configured to adopt a non-orthogonal multiple access (NOMA) of first decoding a signal of an IoT device closest to the gateway, removing a decoded signal of an IoT device, and decoding a signal of an IoT device farthest from the gateway.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
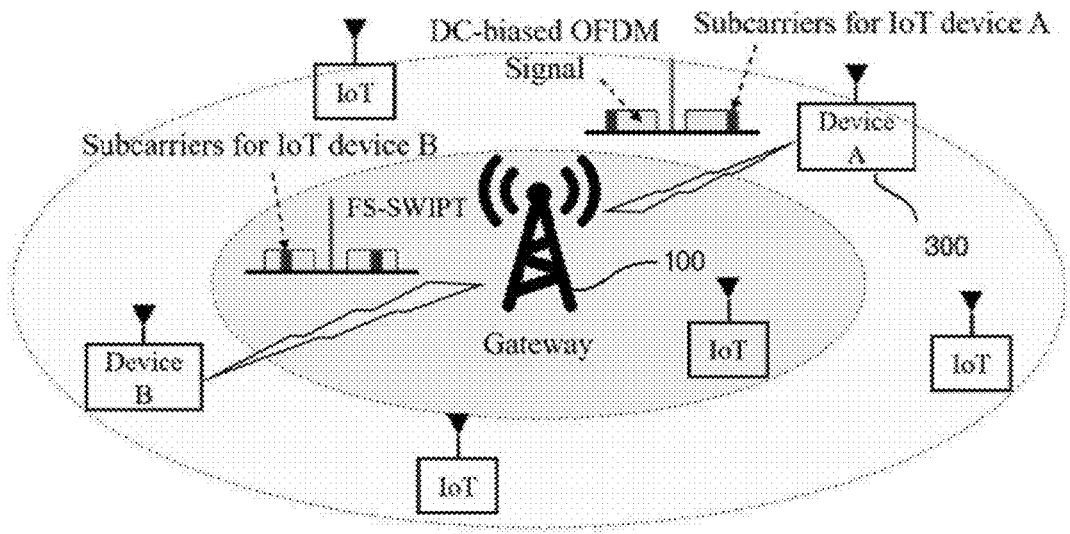
FIG. 1 is a conceptual diagram illustrating an example of an IoT system for frequency-splitting (FS)-simultaneous wireless information and power transfer (SWIPT)-based backscatter-dependent communication according to the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless defined in a different way, all the terms used herein including technical and scientific terms have the same meanings as understood by those skilled in the art to which the present disclosure pertains. Such terms as defined in generally used dictionaries should be construed to have the same meanings as those of the contexts of the related art, and unless clearly defined in the application, they should not be construed to have ideally or excessively formal meanings.

Throughout the specification and claims, when a part includes a certain element, it means that other elements may be further included, rather than excluding other elements, unless specifically stated to the contrary.

An embodiment of the present disclosure provides a device and method for enabling uplink/downlink communications using a frequency splitting (FS)-simultaneous wireless information and power transfer (SWIPT) signal and allowing a plurality of IoT devices to exchange information with an Internet-of-things (IoT) gateway or a hybrid access point (H-AP) with high energy and frequency efficiency.

FIG. 1 is a conceptual diagram illustrating an example of an Internet-of-things (IOT) system for frequency-splitting (FS)-simultaneous wireless information and power transfer (SWIPT)-based backscatter-dependent communication according to the present disclosure.

Referring to FIG. 1, the IoT system for FS-SWIPT-based backscatter-dependent communication according to the present disclosure includes a wireless gateway 100 and one or more IoT devices 300.

The gateway 100 is a device that relays wireless access and data transmission/reception of a terminal in an established communication infrastructure.

A terminal is a device capable of communicating by occupying a channel of the gateway 100 according to an existing communication protocol (e.g., Wi-Fi standard) and may be, for example, a user terminal such as a smartphone or a tablet PC. The terminal of the present disclosure may recognize a nearby IoT device 300 through backscatter-dependent communication and control the IoT device 300.

In addition, the terminal may instruct the gateway 100 to transmit wireless power to the IoT device 300 recognized through the backscatter-dependent communication with the IoT device 300. However, in an embodiment of the present disclosure, a case where the terminal instructs the gateway 100 to transmit wireless power and information may indicate that the gateway 100 transmits wireless power and information. Also, a case where the gateway 100 relays information transmitted from the IoT device 300 to the terminal may indicate that the gateway 100 receives information from the IoT device 300.

The gateway 100 may form a channel with the terminal existing within communication coverage according to a known communication protocol, for example, a Wi-Fi standard, and transmit/receive data through the formed channel. In this case, data transmitted and received through the channel conforms with the Wi-Fi standard. The present disclosure intends to communicate with the IoT device 300 using the gateway 100 and to supply wireless power.

To this end, the gateway 100 according to the present disclosure transmits FS-SWIPT signal to one or more IoT devices 300 to simultaneously transmit information and power.

The IoT device 300 is a device that is a target for wireless power transmission in the backscatter-dependent communication system according to the present disclosure and may be an ultra-small device or portable device that has difficulty supplying power, such as a micro sensor device, an IoT device, or a wearable device.

In an embodiment, the IoT device 300 receives power and data according to the FS-SWIPT method, and decodes and processes a received data packet. In addition, the IoT device 300 transmits tag information according to a backscattering method.

In an embodiment, the IoT device 300 receives power at a first frequency and transmits tag information at a second frequency or frequency band. Here, the first frequency and the second frequency are different from each other.

In the IoT system for the FS-SWIPT-based backscatter-dependent communication described above, multiple IoT devices 300 transmit and receive information through massive access to the gateway 100. The gateway 100 relays wireless access and data transmission/reception of the terminal 200. The gateway 100 transmits an FS-SWIPT signal to simultaneously transmit information and power to the multiple IoT devices 300. Information signal of FS-SWIPT is a DC-biased OFDM modulated signal. The gateway 100 may simultaneously transmit individual information using a subcarrier allocated to each IoT device 300 using the information signal of the FS-SWIPT.

In an embodiment, the IoT devices 300 receive individual information and simultaneously collect energy through an unmodulated single tone power signal of the FS-SWIPT. The IoT devices 300 designate a band near a power signal frequency as a variable frequency band that may be used not only for downlink transmission (download) but also for uplink transmission (upload). In this variable frequency band, the IoT devices 300 may collect sufficient energy through an unmodulated single tone power signal and perform uplink transmission through monostatic backscattering. Through this operation, the gateway 100 performs massive access communication with multiple IoT devices 300.

Figure 2:
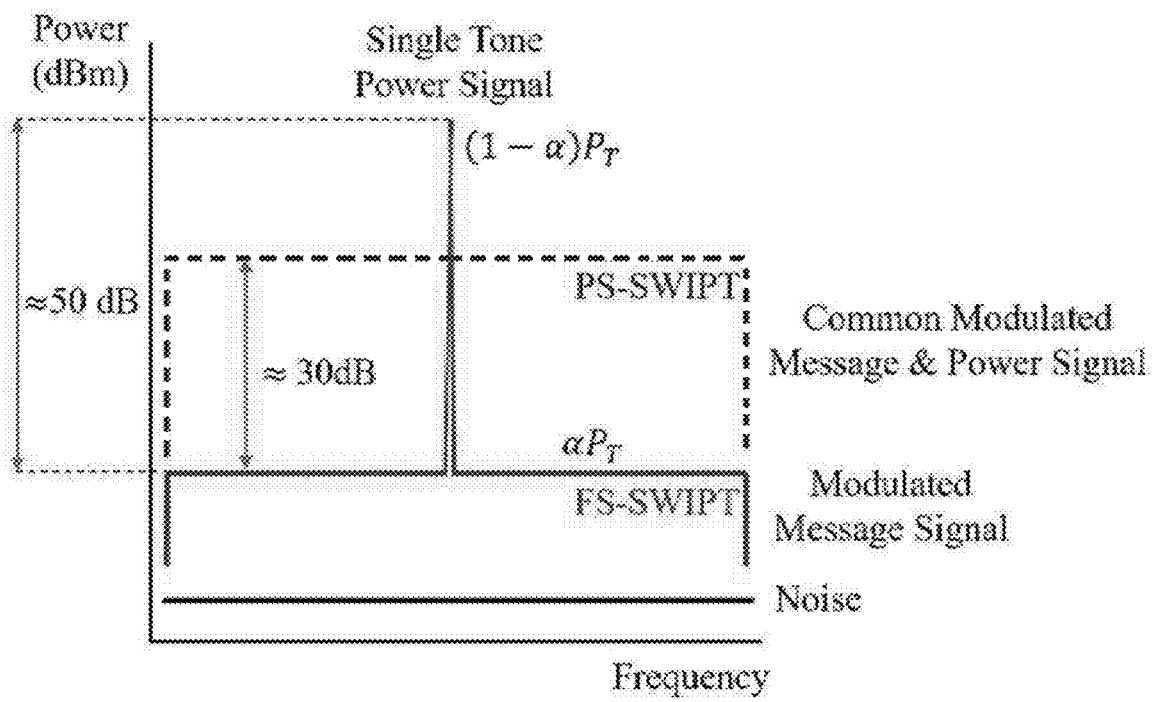
FIG. 2 is a diagram illustrating an example of a communication spectrum of FS-SWIPT, according to an embodiment of the present disclosure, compared with that of PS-SWIPT.

FIG. 2 is a diagram illustrating an example of a communication spectrum of FS-SWIPT compared with that of PS-SWIPT according to an embodiment of the present disclosure.

Referring to FIG. 2, it can be seen that the communication spectrum of FS-SWIPT indicated by the solid line according to an embodiment of the present disclosure has a single tone power signal and a modulated information signal having relatively low power, compared with the single tone power signal in a preset communicable frequency band. In FIG. 2, it can be seen that the power signal of the FS-SWIPT and the information signal have a power difference of about 50 dB.

Meanwhile, in the communication spectrum of PS-SWIPT indicated by the dotted line, power appears evenly in a preset communicable frequency band. It can be seen that the information signal shown in the communication spectrum of PS-SWIPT has about 30 dB higher power than power of the information signal shown in the communication spectrum of FS-SWIPT. The power for signal transmission presented in FIG. 2 is only an example and is not limited thereto.

Figure 3:
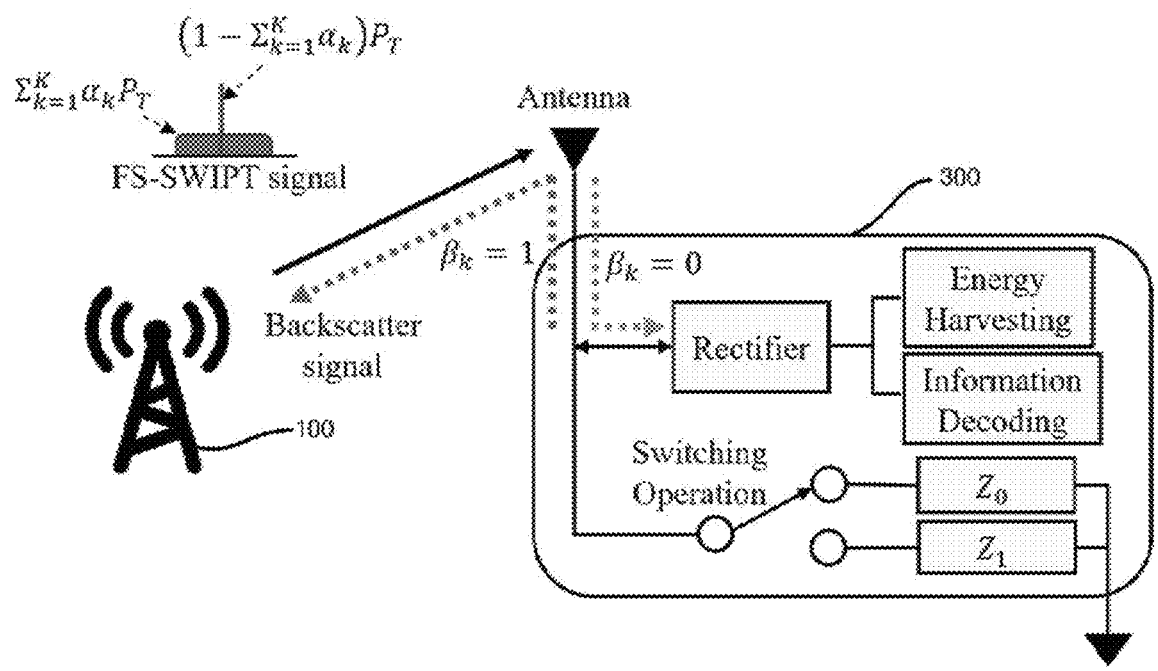
FIG. 3 is a diagram illustrating an example of an uplink communication method of multiple Internet-of-things (IOT) devices according to an embodiment of the present disclosure.
Figure 4:
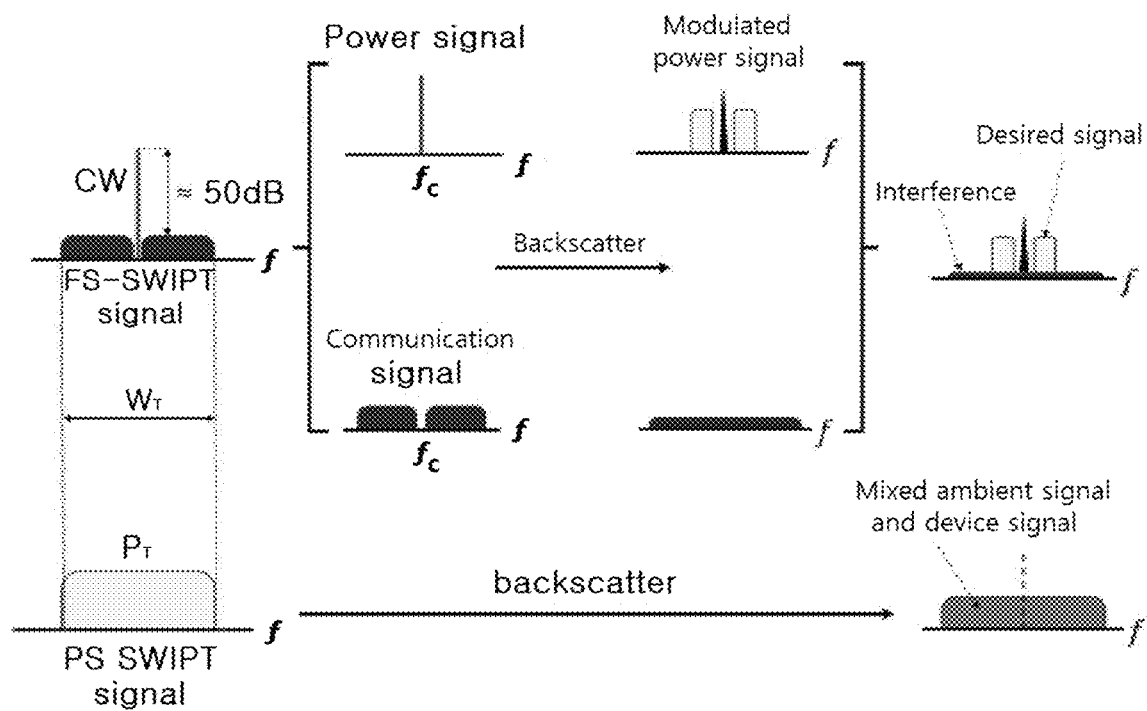
FIG. 4 is a diagram for comparing a backscatter communication spectrum of FS-SWIPT and a backscatter communication spectrum of PS-SWIPT of multiple IoT devices.

FIG. 3 is a diagram illustrating an example of an uplink communication scheme of multiple IoT devices according to an embodiment of the present disclosure, and FIG. 4 is a diagram illustrating comparison between backscatter communication spectrum of FS-SWIPT and a backscatter communication spectrum of PS-SWIPT of multiple IoT devices.

First, referring to FIGS. 3 and 4, the IoT device 400 receives an FS-SWIPT signal from the gateway 100. The FS-SWIPT signal includes a first frequency fc power signal having a relatively high energy and an information signal having a relatively low energy.

Assuming that the IoT device 400 of FIG. 3 is a k-th IoT device that has received the FS-SWIPT signal, monostatic backscatter communication is performed by reflecting the unmodulated single tone power signal having a strong strength from the signal received by the FS-SWIPT.

The backscatter signal received from the gateway 100 may be expressed by [Equation 1].

$$y_{FS} = \sigma \sqrt{\left(1 - \sum_{k=1}^{K} \alpha_k\right) P_T \beta_k h^2} c + \sigma \sqrt{\left(\sum_{k=1}^{K} \alpha_k\right) P_T \beta_k h^2}\, ac + n \quad \text{[Equation 1[}$$

Here, $P_T$ is transmission power of the gateway, a is scattering efficiency, h is a channel gain, s is information transmitted from the gateway, c is tag information, and n is noise. In addition, $\alpha_k$ (=1, 2 . . . , K) is the ratio of a signal strength allocated to the information transmission signal of the FS-SWIPT for each IoT device 400. Therefore, strength of information transmission signal for a k-th IoT device 400 at a transmitting end may be expressed as a product $\alpha_k P_T$ of the ratio of the signal strength and the transmission power, and strength of the power signal is $$\left(1 - \sum_{k=1}^{K} \alpha_k\right) P_T,$$

which is a difference between the sum of information transmission signal of the IoT device 400 of each transmission end and a total transmission power.

In addition, if a reflection ratio of the FS-SWIPT signal received by the k-th IoT device 400 is $\beta_k$, all the non-reflected signals are absorbed, so an absorption ratio is $(1-\beta_k)$. The value $\beta_k$ is determined according to a value of the reflection coefficient based on impedance matching in the IoT device 400.

A first term in Equation 1 represents the reflected power signal, and a second term represents the reflected information signal.

As shown in FIG. 4, it can be seen that the reflected information signal included in the backscatter signal acts as interference in the H-AP but is very weak compared to the reflected power signal included in the backscatter signal.

Therefore, the terminal that has received the backscatter signal through the gateway 100 treats the reflected information signal included in the backscatter signal like noise, and decodes only the information of the reflected power signal included in the backscatter signal to receive information of the IoT device. That is, the terminal that has received the backscatter signal through the gateway 100 may simply decode the information of the IoT device through the reflected power signal, which is the first term of Equation 1.

Meanwhile, in the case of the PS-SWIPT signal, even if the signal is transmitted in the same environment as that of the FS-SWIPT signal, the terminal receiving the backscatter signal through the gateway 100 may recognize that a frequency band thereof to be decoded is wider than that of the FS-SWIPT case. That is, it can be seen that the FS-SWIPT-based backscattering method according to an embodiment of the present disclosure is more efficient for decoding.

Figure 5:
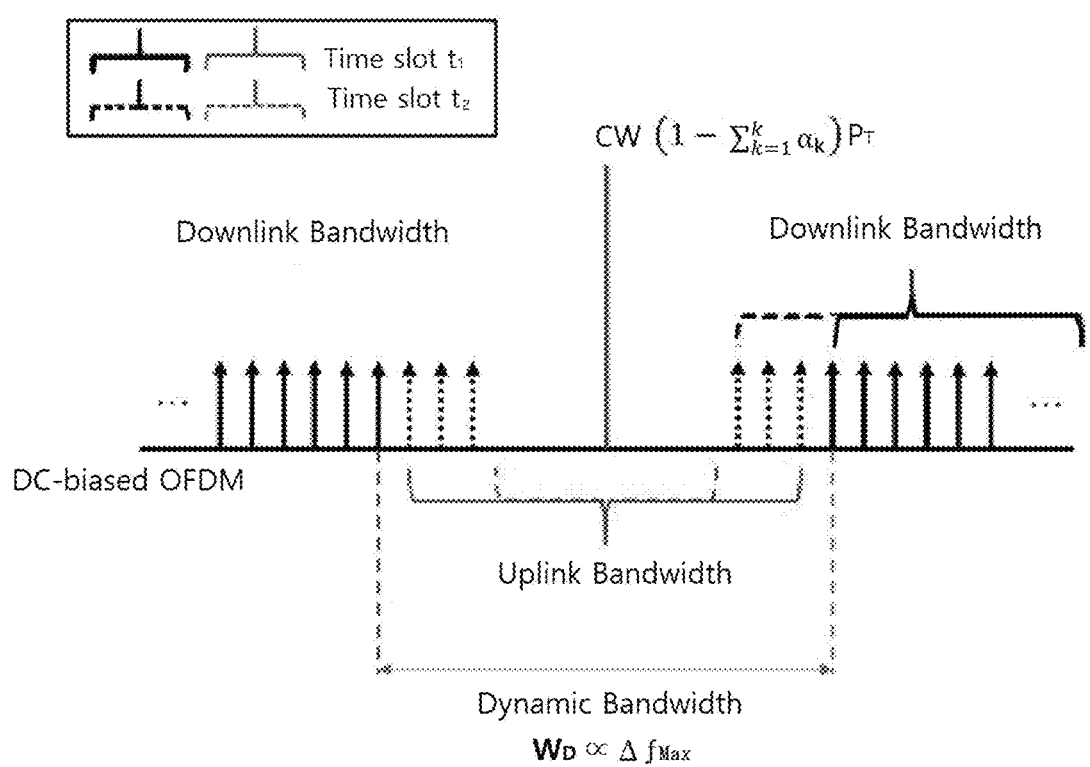
FIG. 5 is a diagram illustrating an example of a signal spectrum of FS-SWIPT based on a variable frequency band according to an embodiment of the present disclosure.

FIG. 5 is a diagram illustrating an example of a signal spectrum of FS-SWIPT based on a variable frequency band according to an embodiment of the present disclosure.

In an embodiment, a frequency band that may be used for uplink or downlink may be dynamically allocated for massive access when multiple IoT devices perform uplink transmission.

Referring to FIG. 5, a variable frequency band $W_D$ is set as a band near a power signal frequency CW of the FS-SWIPT. When the IoT device performs monostatic backscattering using a power signal, a spectrum shifted from the power signal frequency by a switching frequency value is formed. In this case, as a switching frequency for the backscattering operation in the IoT device increases, more power is consumed. That is, more power is consumed during the backscattering operation in the frequency band distant from a power signal frequency fc of the FS-SWIPT in the IoT device. Accordingly, in order to increase energy efficiency during uplink transmission, a frequency band near the power signal frequency fc of the FS-SWIPT is set as a variable frequency band.

In another embodiment, an uplink frequency band and a downlink frequency band may be dynamically allocated by introducing a variable frequency band. When the uplink frequency band and the downlink frequency band are dynamically allocated, respective bands of the uplink frequency band and the downlink frequency band may be variable.

When the uplink frequency band and the downlink frequency band are dynamically allocated operated, the downlink frequency band, which is relatively free from energy efficiency of power, uses a band farther from the power signal frequency fc than the uplink frequency band, and the uplink frequency band uses a band close to the power signal frequency fc than the downlink frequency band.

That is, when the uplink traffic is heavier, the uplink frequency band indicated by the red solid line may be widened and the downlink frequency band indicated by the thick line may be narrowed. Conversely, when the downlink traffic is heavier, the downlink frequency band indicated by the thick line may be widened and the uplink frequency band indicated by the red dotted line may be narrowed. In this manner, frequency resources may be efficiently managed using the variable frequency band. In addition, when the uplink frequency band and the downlink frequency band are operated separately, there is an advantage that the gateway does not need to perform self-interference cancellation.

Meanwhile, the gateway sets a ratio value $\alpha_k$ of a signal strength of each IoT device. In this case, the ratio of the signal strength is set to satisfy a minimum reception power constraint of each IoT device and a minimum transfer rate constraint of a received communication signal. Here, it is assumed that the gateway transmits the FS-SWIPT signal only to IoT devices that collect energy through downlink transmission and decode information. That is, the gateway 100 does not transmit the FS-SWIPT signal to an IoT device performing uplink transmission during a corresponding time slot and allocates 0 as the value of $\alpha_k$ to the corresponding IoT device.

Next, the sum of the strength of the communication signals of the IoT devices is $$\left(1 - \sum_{k=1}^{K} \alpha_k\right) P_T,$$

and thus, strength of the gateway power signal is $$\left(1 - \sum_{k=1}^{K} \alpha_k\right) P_T.$$

Figure 6:
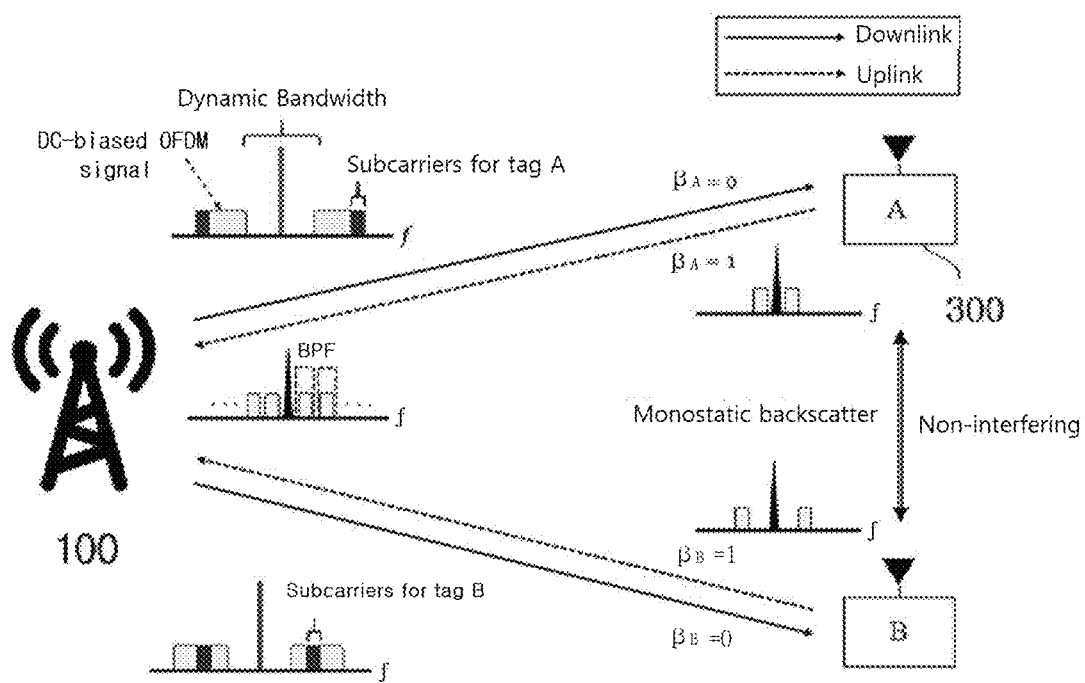
FIG. 6 is a diagram illustrating an example of a signal spectrum of FS-SWIPT based on a variable frequency band according to another embodiment of the present disclosure.
Figure 7:
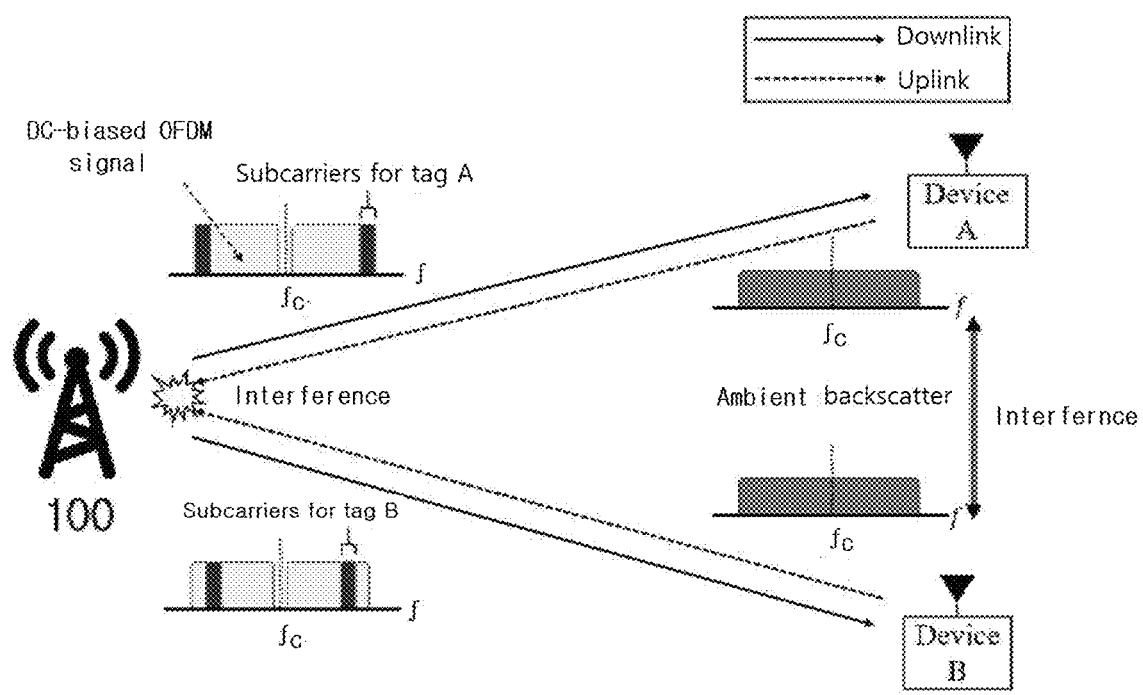
FIG. 7 is a diagram illustrating a PS-SWIPT signal spectrum based on a variable frequency band.

FIG. 6 is a diagram illustrating an example of a signal spectrum of an FS-SWIPT based on a variable frequency band according to another embodiment of the present disclosure, and FIG. 7 is a diagram illustrating a signal spectrum of a PS-SWIPT based on a variable frequency band.

Referring to FIG. 6, it is assumed that a first IoT device A and a second IoT device B receive the FS-SWIPT signal transmitted from the gateway 100, collect sufficient energy, and then perform uplink transmission. That is, the first IoT device A and the second IoT device B have a value of $\beta_k=0$ when receiving the FS-SWIPT signal, and have a value of $\beta_k=1$ when performing uplink transmission.

Here, an uplink channel within a variable frequency band is allocated to each of the first IoT device A and the second IoT device B, and the first IoT device A and the second IoT device B transmit information to the gateway 100 to perform uplink transmission without signal collision and interference with each other.

Here, the variable frequency band has a limited band with respect to the maximum switching frequency that the IoT devices may have. Therefore, allocation of the uplink transmission channel to each of the IoT devices within the limited variable frequency band is performed as follows.

When the gateway allocates an uplink transmission frequency band using a variable frequency band, it may be desirable to consider any one or any combination of any two or more of energy collection of IoT devices, channel environment, fairness, and traffic $\Delta_k$ for each IoT device. First, only the IoT device that has collected sufficient energy may perform uplink transmission.

First, a first set of IoT devices that have collected a predetermined energy or more capable of performing uplink transmission is formed. Next, a second set of IoT devices having a good channel between the gateway and the IoT devices in the first set of IoT devices capable of performing uplink transmission is formed. Thereafter, the second set of IoT devices capable of performing uplink transmission may be given priority for transmission frequency band allocation.

Meanwhile, if the channel is good, priority is given for frequency band allocation, but fairness should also be considered. Additionally, the channel allocated to each IoT device in the limited variable frequency band may be given as a function of traffic of the IoT device. Hereinafter, a frequency allocation method considering priority is described in detail.

In the present disclosure, the FS-SWIPT signal is adopted in a system for communication between the gateway and several IoT devices. It cannot be replaced by another SWIPT signal. For example, referring to FIG. 7, when performing communication with several IoT devices using the PS-SWIPT signal in which a power signal among the SWIPT signals and a communication signal are modulated together and transmitted, several backscatter signals received by the gateway may interfere with each other so that information transmitted by each device cannot be decoded.

Specifically, when the PS-SWIPT signal to which a subcarrier is allocated to each tag is used through DC-biased OFDM modulation, uplink transmission is performed from a backscatter tag by ambient backscatter. Here, the backscatter tag reflects the entire frequency band of the PS-SWIPT signal, so that the backscatter signal also occupies a frequency band having the same magnitude as that of the PS-SWIPT signal. That is, in order for signals reflected from each IoT device to perform uplink transmission without interference, a very wide frequency band is desired, which not only has very low frequency efficiency but also requires a very high switching frequency. In the case of using a limited frequency band, the ambient backscatter signals received from the gateway interfere with each other, making decoding impossible. In addition, the backscatter signal and the PS-SWIPT signal interfere with each other, making downlink transmission impossible. Therefore, massive uplink/downlink communication may be performed without interference only when the FS-SWIPT signal is used.

Figure 8:
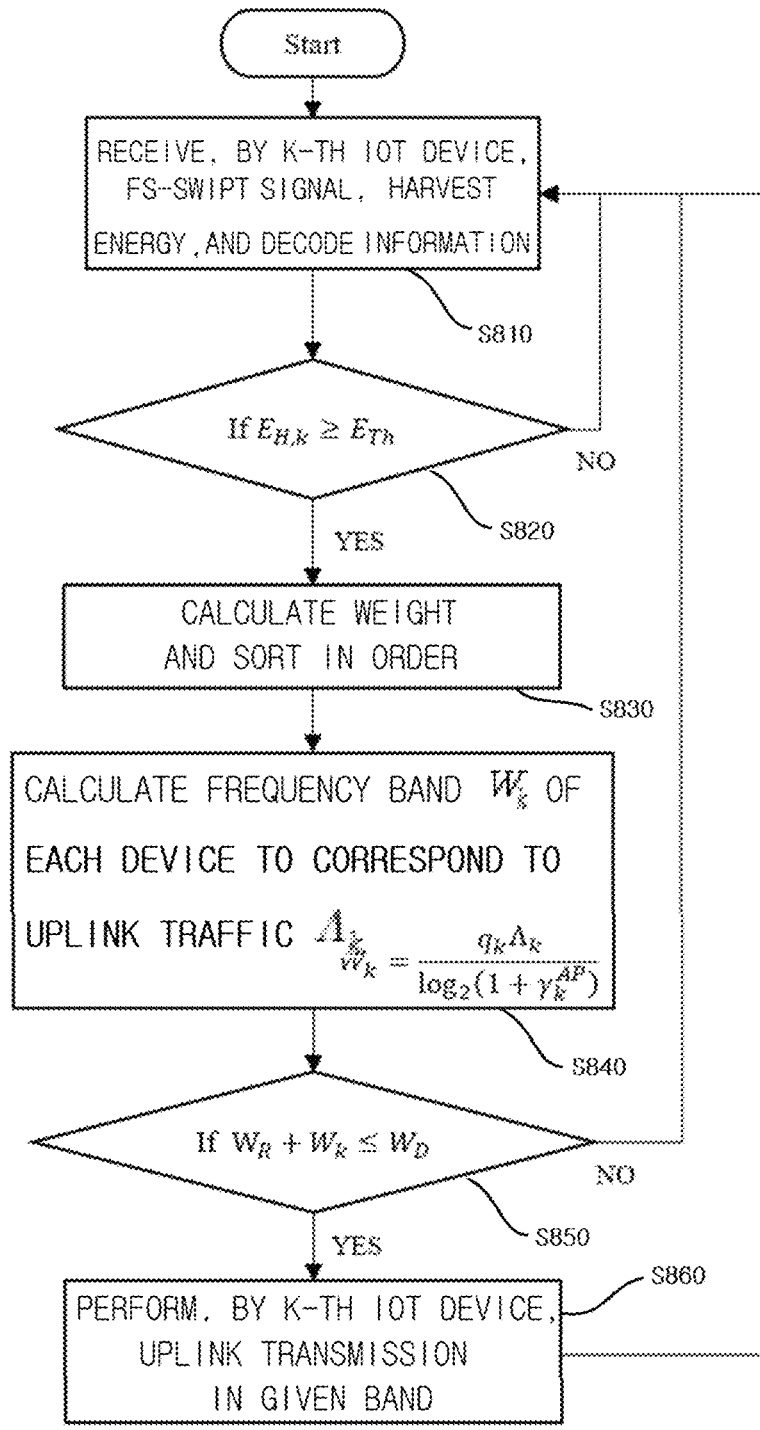
FIG. 8 is a flowchart illustrating an example of a method of allocating an uplink transmission frequency band using a variable frequency band according to another embodiment of the present disclosure.

FIG. 8 is a flowchart illustrating an example of a method of allocating an uplink transmission frequency band using a variable frequency band according to another embodiment of the present disclosure.

In operation S810, each IoT device receives the FS-SWIPT signal, collects energy, and simultaneously decodes individual information.

In operation S820, each device determines whether the collected energy $E_{H,k}$ is equal to or greater than a preset threshold energy $E_{Th}$.

An energy collection state $E_{H,k}(n)$ in an n-th time slot of the IoT device is calculated by Equation 2 below.

$$E_{H,k}(n) = \begin{cases} E_{H,k}(n-1) + P_{H,k}\tau - E_{S,k} & \text{if } E_{H,k}(n-1) \le E_{Th} \\ E_{H,k}(n-1) - E_{S,k} - E_{C,k} & \text{if } E_{H,k}(n-1) > E_{Th} \end{cases} \quad \text{[Equation 2]}$$

Here, r is a time slot period, $E_{S,k}$ is power consumed for signal processing and self-operation of an ê-th IoT device, and $E_{c,k}$ is power consumed during uplink transmission of the ê-th IoT device. Also, $P_{H,k}$ is collected power of the ê-th IoT device and is calculated through the Friss path loss model as in Equation 3.

$$P_{H,k} = \frac{\left(1 - \sum_{k=1}^{K}\alpha_k\right)P_T G_T G_I \lambda^2 h_k}{(4\pi d_0)^2}\left(\frac{d_0}{d_k}\right)^a (1-\beta_k)\gamma_l \quad \text{[Equation 3]}$$

In operation S830, for the first set of IoT devices that have collected sufficient energy, a weight based on a channel state and fairness is calculated and arranged in order.

A weight $WF_k$ considering a channel state and fairness of the ê-th IoT device may be calculated as shown in Equation 4 and Equation 5.

$$WF_k(n) = \frac{C_k(n)}{\overline{R_k}(n-1)} \quad \text{[Equation 4]}$$

$$\overline{R_k}(n) = \left(1 - \frac{1}{t_c}\right)\overline{R_k}(n-1) + \frac{1}{t_c}R_k(n) \quad \text{[Equation 5]}$$

Here, $C_k(n)$ is a maximum transfer rate (bit/sec) that the ê-th IoT device may transmit in an n-th time slot. $\overline{R_k}(n)$ and $R_k(n)$ are an average transfer rate (bits/sec) up to the n-th time slot of the ê-th IoT device and a transfer rate (bits/sec) in the n-th time slot, respectively. When the corresponding IoT device does not perform uplink transmission in the n-th time slot, $R_k(n)=0$. Also, $t_e$ is an averaging window length. Through such weight calculation, priority may be given to IoT devices with good channel conditions and devices that have not sent information for a long time.

In operation S840, a frequency band $W_k$ to be occupied by each device during uplink transmission is calculated based on traffic $\Lambda_k$(bit/sec) for each IoT device.

First, when performing energy collection and information decoding operations, the IoT devices accumulate arrived traffic in a data queue. Thereafter, the information accumulated in the data queue is transmitted to the IoT gateway by collecting sufficient energy and performing uplink transmission. Therefore, the frequency band $W_k$ used for uplink transmission may be calculated as a function of traffic through the known Shannon's channel capacity theorem.

In addition, the SNR $y_k^{AP}$ of the backscatter signal of the IoT device is calculated as in Equation 6.

$$\gamma_k^{AP} = \frac{\left(1 - \sum_{k=1}^{K}\alpha_k\right)k^2 P_T G_T G_R G_t^2 \lambda^4 h_k^2}{(4\pi d_0)^2 N_o W_k}\left(\frac{d_0}{d_k}\right)^{2\mu}\beta; \quad \text{[Equation 6]}$$

In operation S840, after calculating a frequency band for each device as a function of traffic generated by each IoT device, uplink frequency bands are allocated in order of weight, starting from the highest weight. In this case, if a frequency band to be allocated exceeds the limited variable frequency band, IoT devices having a low weight undergo a process of calculating the weight again in a next time slot. That is, when the frequency band $W_k$ requested by the 2-th IoT device is additionally allocated in a frequency band already occupied by IoT devices having a higher weight value, if the frequency band $W_k$ does not exceed the variable frequency band $W_k$ of a maximum size, the corresponding IoT device performs uplink transmission in operation S850. Through this algorithm, uplink transmission considering all of energy collection conditions, channel environment, fairness, and traffic may be performed.

Figure 9:
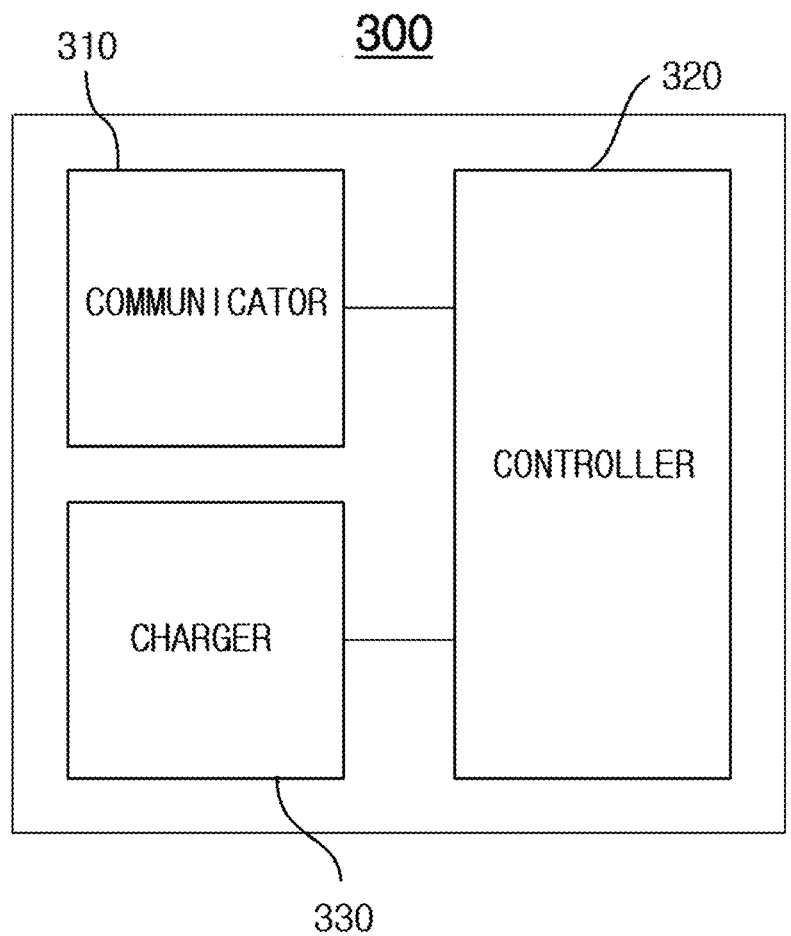
FIG. 9 is a block diagram illustrating an example of a configuration of an IoT device according to an embodiment of the present disclosure.
Figure 10:
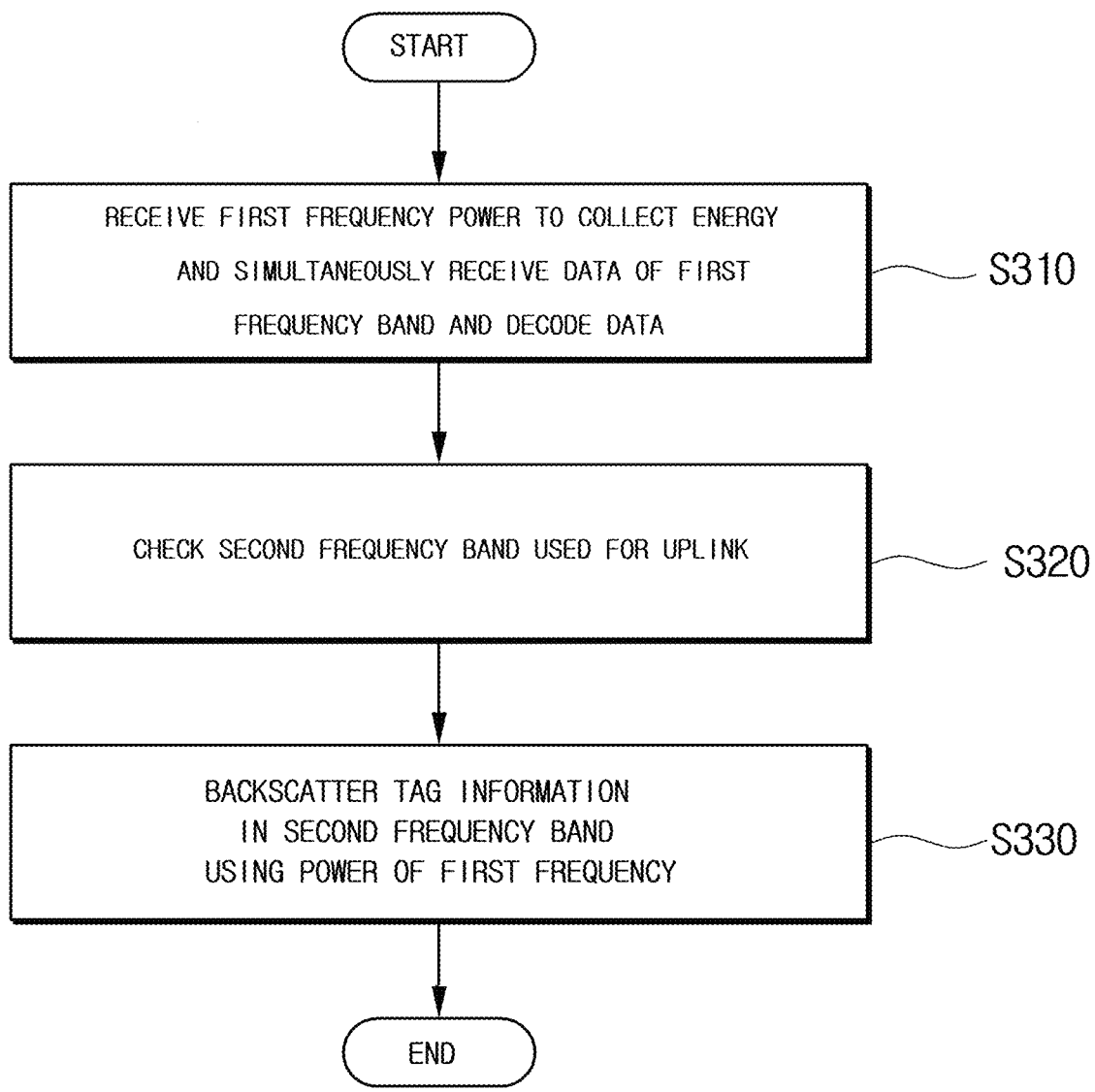
FIG. 10 is a flowchart illustrating an example of an operation of an IoT device according to an embodiment of the present disclosure.

FIG. 9 is a block diagram illustrating an example of a configuration of an IoT device according to an embodiment of the present disclosure, and FIG. 10 is a flowchart illustrating an example of an operation of an IoT device according to an embodiment of the present disclosure.

Referring to FIGS. 9 and 10, an IoT device 300 according to an embodiment may include a communicator 310, a controller 320, and a charger 330.

The communicator 310 supports communication according to a backscatter method without power.

The controller 320 controls the components of the IoT device 300 to perform backscattering of the IoT device.

The charger 330 is a component for supporting operating power for each sensor of the IoT device 300, and may refer to a battery and circuit charged by receiving wireless power.

In operation S310, the controller 320 receives power having a first frequency through the communicator 310 to collect energy and simultaneously receives and decodes data of the first frequency band. Here, a signal received through the communicator 310 is an FS-SWIPT-based signal.

In operation S320, the controller 320 checks a second frequency band used for uplink. Here, the second frequency band is allocated based on the collected energy amount, channel environment, fairness, and traffic. Information on the second frequency band may be included in the data of the first frequency band received from a gateway.

In an embodiment, fairness may be calculated based on a ratio of the current maximum transfer rate to the previous average transfer rate in each time slot.

In an embodiment, traffic may be calculated in proportion to the number of time slots accumulated in a queue without being transmitted to uplink.

In operation S330, the controller 320 transmits tag information in the second frequency band through the communicator 310 in a backscattering manner using the power of the first frequency collected in the charger 330.

In an embodiment, the second frequency band may be closer to the first frequency than the first frequency band.

Figure 11:
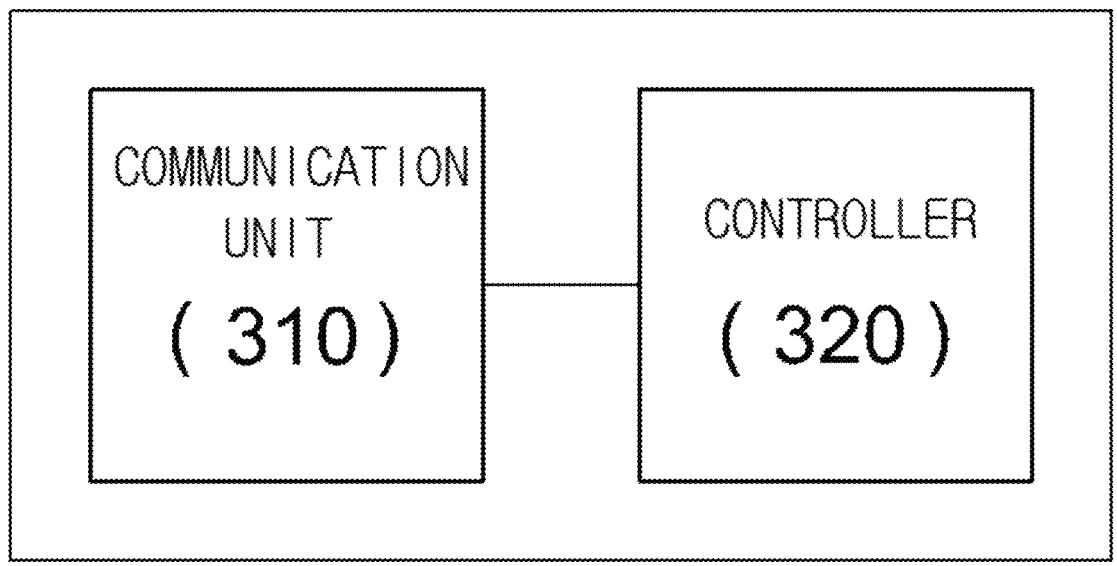
FIG. 11 is a block diagram illustrating an example of a configuration of a gateway for allocating an uplink frequency band of an IoT device of a wireless communication system according to an embodiment of the present disclosure.
Figure 12:
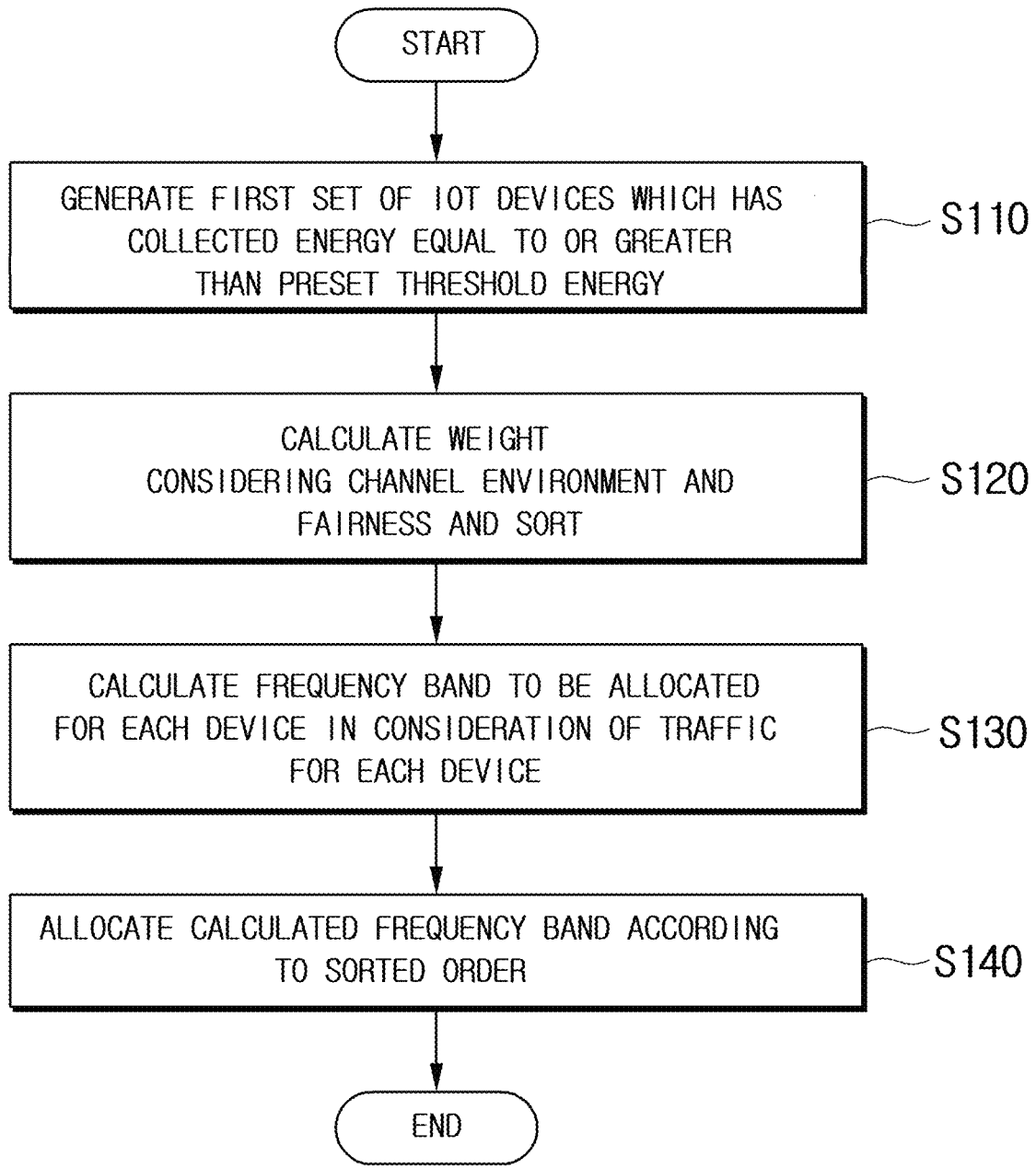
FIG. 12 is a flowchart illustrating an example of a method of allocating an uplink frequency band for an IoT device by a gateway according to an embodiment of the present disclosure.

FIG. 11 is a block diagram illustrating an example of a configuration of a gateway for allocating an uplink frequency band of an IoT device of a wireless communication system according to an embodiment of the present disclosure, and FIG. 12 is a flowchart illustrating an example of a method of allocating an uplink frequency band for an IoT device by a gateway according to an embodiment of the present disclosure.

Referring to FIGS. 11 and 12, a gateway 100 for allocating an uplink frequency band of an IoT device of a wireless communication system according to an embodiment includes a transceiver 110 and a controller 120.

The transceiver 110 transmits/receives information to and from multiple IoT devices. The transceiver 110 simultaneously transmits FS-SWIPT-based power and information.

The controller 120 generates a first set of IoT devices collected over a preset threshold energy, calculates a weight based on a channel environment and fairness, sorts the IoT devices in order of weight, calculates a frequency band to be allocated to each device based on traffic for each device, and allocates the calculated frequency band according to the sorted order.

In operation S110, the controller 120 generates a first set of IoT devices that have collected energy equal to or greater than a preset threshold energy.

In operation S120, the controller 120 calculates a weight based on a channel environment and fairness and sorts the IoT devices in order of weight.

In an embodiment, the controller 120 calculates the fairness based on the ratio of the current maximum transfer rate to a previous average transfer rate in each time slot.

In operation S130, the controller 120 calculates a frequency band to be allocated to each device based on traffic for each device.

In an embodiment, the controller 120 calculates a frequency band to be allocated by applying traffic calculated in proportion to the number of time slots accumulated in a queue without being transmitted to uplink to the Shannon's channel capacity theorem.

In operation S140, the controller 120 allocates the calculated frequency band according to the sorted order.

In an embodiment, the controller 120 allocates a frequency band near the first frequency to the IoT device closer to the gateway.

When the IoT gateway transmits information and power to each IoT device using the FS-SWIPT signal, IoT devices located near the gateway do not have much difficulty in collecting energy to perform uplink transmission, but IoT devices far from the gateway require much time to collect energy for performing uplink transmission because a relatively weak power signal is received. Therefore, when performing uplink transmission in the variable frequency band, an uplink frequency band is allocated near a power signal (center frequency) for an IoT device far from the gateway. As such, by allowing the devices located far away and having difficulty in collecting energy to use a low switching frequency, power consumption may be minimized.

In an embodiment, the controller 120 may utilize a non-orthogonal multiple access (NOMA) technique by utilizing a difference in distance between the gateway and the IoT devices. When a frequency band to be allocated exceeds a preset variable frequency band, the controller 120 calculates a weight and a frequency band for transmission in a next time slot for the corresponding IoT device and the IoT device having a lower weight than the corresponding IoT device.

Specifically, since IoT devices far from the gateway perform backscattering using a relatively weak power signal, these IoT devices have weak backscatter signal strength compared to IoT devices located close to the gateway. In such an environment, the same frequency band may be allocated to IoT devices through a NOMA technique of first decoding a signal of an IoT device located near the gateway, removing a signal of the IoT device located near through successive interference cancellation, and decoding a signal of an IoT device located far away. In the case of downlink, DC-biased OFDM modulation-based NOMA may be used in an IoT gateway as well. By utilizing such a NOMA technique, a limited variable frequency resource may be efficiently used.

Figure 13:
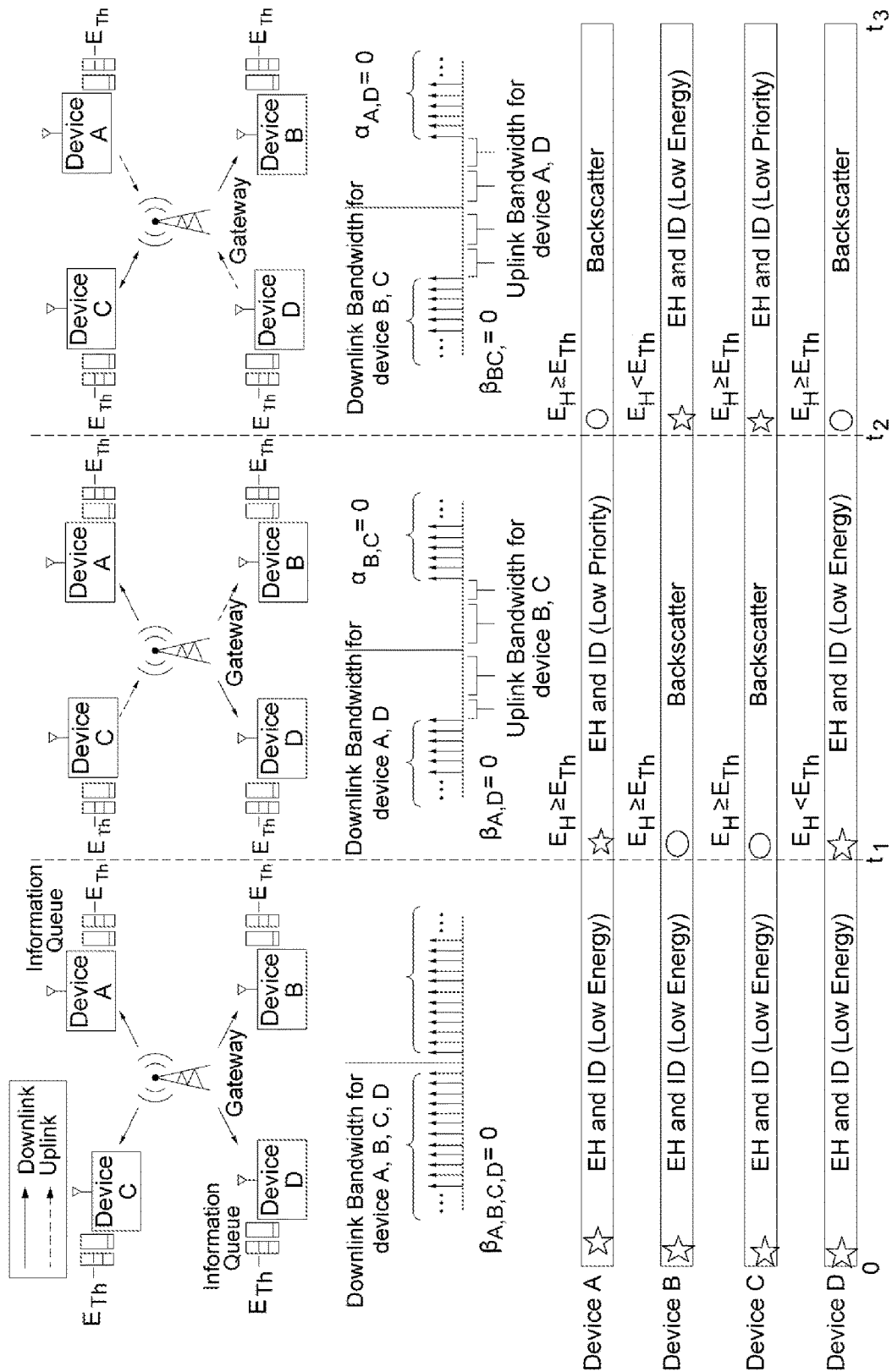
FIG. 13 is a diagram illustrating an example of a large-scale connection between a gateway and multiple IoT devices according to an embodiment of the present disclosure.

In an embodiment of the present disclosure, when the gateway has the transceiver 110 including multiple transmit/receive antennas (MIMO), communication coverage of the proposed disclosure may be increased by performing downlink energy beamforming. In addition, in this case, the gateway may allocate the same frequency band within the second frequency band to IoT devices through spatial domain multiple access (SDMA) using multiple transmit/receive antennas such as zero forcing (ZF) beamforming, so that information of the IoT device may be transmitted to uplink. That is, different frequency resources in the second frequency band may be allocated to the IoT devices so that the IoT devices may transmit information to the gateway, or the same frequency resource in the second frequency band may be allocated to the IoT devices so that the IoT device may transmit information to the gateway. Through this, system coverage may be increased by utilizing the multiple transmit/receive antenna technique in the proposed system, and limited variable frequency resources may be efficiently used. FIG. 13 is a view illustrating massive access of a gateway and multiple IoT devices according to an embodiment of the present disclosure.

Referring to FIG. 13, a gateway located in the center and multiple IoT devices connected to the periphery of the gateway are illustrated. In an embodiment, only four IoT devices are illustrated for convenience of description, but the present disclosure is not limited thereto.

At the bottom, a collected energy amount of each IoT device (A, B, C, and D) is shown. The star indicates that an energy amount equal to or lower than a preset threshold or low priority is given. The circle color indicates the amount of energy that may be backscattered.

The first example is an example in which each IoT device (A, B, C, and D) receives power using uplink close to the center frequency. It can be seen that collected energy is still small.

The second example is an example in which IoT device A and IoT device D receive power using uplink adjacent to the center frequency, and IoT device B and IoT device C transmit tag information through backscattering using downlink. It can be seen that a frequency band (indicated in up line) used for downlink allocated to IoT device A and IoT device D is located farther from the center frequency than a frequency band (indicated in down) applied to uplink allocated to IoT device B and IoT device C.

The third example is an example in which IoT device B and IoT device C receive power using uplink adjacent to the center frequency, and IoT device A and IoT device D transmit tag information through backscattering using downlink. It can be seen that a frequency band (indicated in blue) used for downlink allocated to IoT device B and IoT device C is located farther from the center frequency than a frequency band (indicated in red) applied to uplink allocated to IoT device A and IoT device D.

According to an embodiment of the present disclosure, from the viewpoint of performing communication between the IoT gateway and a single IoT device, a wider range of communication coverage than before may be provided and a high transfer rate may be provided. Through this, the IoT communication network may be stably and flexibly operated, and sensor information may be rapidly collected through a high transfer rate. In addition, communication between the IoT gateway and multiple IoT devices may be performed through the FS-SWIPT-based backscattering technique using a variable frequency band, and superior performance in terms of energy efficiency, frequency efficiency, and complexity to existing techniques may be obtained. Based on this, the present disclosure may be utilized in a smart factory in which numerous IoT gateways need to exchange information with IoT sensors.

According to an embodiment of the present disclosure, energy and frequency may be efficiently used for communication between a gateway and IoT devices using an uplink/downlink communication technique using an FS-SWIPT signal adopting a variable frequency band.

In addition, according to an embodiment of the present disclosure, a frequency used for uplink transmission is allocated distinguishably with downlink through the use of a variable frequency band, and self-interference in a gateway may be minimized by performing monostatic backscattering using FS-SWIPT.

In addition, according to an embodiment of the present disclosure, since FS-SWIPT signal-based backscattering has a wider coverage compared to the existing low-power communication technique, low-power devices may be flexibly operated and uplink transfer rate and spectrum efficiency may be improved to increase efficiency of resource management.

The communicator 310, charger 330, and controller 320 in FIGS. 1-3 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding-descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in, or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A backscattering method for an Internet-of-things (IoT) device comprising a frequency-splitting (FS)-simultaneous wireless information and power transfer (SWIPT) wireless communication system, the backscattering method comprising:
    collecting energy by receiving a power signal having a first frequency;
    receiving and decoding a data signal transmitted in a first frequency band different from the first frequency;
    generating tag information comprising uplink data of the IoT device;
    determining a second frequency band for uplink transmission; and
    transmitting the tag information in the second frequency band by modulating the impedance of the IoT device to reflect the power signal having the first frequency in a backscattering manner.

2. The backscattering method of claim 1, wherein
    the second frequency band is allocated based on any one or any combination of any two or more of amounts of the collected energy, a channel environment, fairness, and traffic.

3. The backscattering method of claim 2, wherein
    the fairness is determined based on a ratio of a current maximum transfer rate to a previous average transfer rate in each time slot.

4. The backscattering method of claim 2, wherein
    the traffic is in proportion to the number of time slots not transmitted to the uplink but accumulated in a queue.

5. The backscattering method of claim 1, wherein
    the second frequency band is closer to the first frequency than the first frequency band.

6. An Internet-of-things (IoT) device comprising a frequency-splitting (FS)-simultaneous wireless information and power transfer (SWIPT) wireless communication system, the IoT device comprising:
    a communicator configured to receive a power signal having a first frequency and a data signal transmitted in a first frequency band different from the first frequency;
    a charger configured to collect energy from the power having the first frequency; and
    a controller configured to decode the data signal, generate tag information comprising uplink data of the IoT device, determine a second frequency band for uplink transmission, and control the communicator to transmit tag information in the second frequency band by modulating the impedance of the IoT device to reflect the power signal in a backscattering manner.

7. The IoT device of claim 6, wherein the controller is further configured to allocate
    the second frequency band to the IoT device based on any one or any combination of any two or more of amounts of the collected energy, a channel environment, fairness, and traffic.

* * * * *